United States Patent [19]
Hill

[11] 3,729,539
[45] Apr. 24, 1973

[54] COOLING OF PLASTIC EXTRUSIONS OF SMALL CROSS-SECTIONAL AREA

[75] Inventor: Alan Harvey Hill, Darlington, England

[73] Assignees: General Engineering Company (Radcliffe) Limited; British Insulated Callender's Cables Limited, London, England

[22] Filed: June 30, 1970

[21] Appl. No.: 51,309

[52] U.S. Cl. ............... 264/89, 264/174, 264/178, 264/237, 264/348
[51] Int. Cl. ........................ B29c 25/00, B29f 3/10
[58] Field of Search ............ 264/237, 248, 176, 264/178, 174, 88, 89, 95, 209

[56] References Cited

UNITED STATES PATENTS

| | | | |
|---|---|---|---|
| 3,090,998 | 5/1963 | Heisterkamp et al. | 264/237 |
| 3,207,823 | 9/1965 | Glyde et al. | 264/95 |
| 3,311,682 | 3/1967 | Ringley et al. | 264/95 |
| 3,377,413 | 4/1968 | Jansson et al. | 264/95 |
| 3,295,163 | 1/1967 | Bachus | 264/348 |
| 2,399,422 | 4/1946 | Back | 264/348 |
| 1,740,029 | 12/1929 | Moomy | 264/237 |
| 3,211,818 | 10/1965 | Beckwith | 264/174 |
| 3,428,726 | 2/1969 | Moss | 264/237 |
| 3,341,637 | 9/1967 | Nicholson | 264/174 |

*Primary Examiner*—Robert F. White
*Assistant Examiner*—Jeffery R. Thurlow
*Attorney*—James E. Nilles

[57] ABSTRACT

A method of cooling a plastic extrusion of small cross sectional area, which method includes the steps of drawing the extrusion along a predetermined path and directing water onto it at least at one position along the path so as not to disturb the lateral stability of the extrusion. The water impinging on the extrusion has a substantial component of velocity in the direction in which the extrusion is being drawn.

6 Claims, 3 Drawing Figures

Patented April 24, 1973 3,729,539
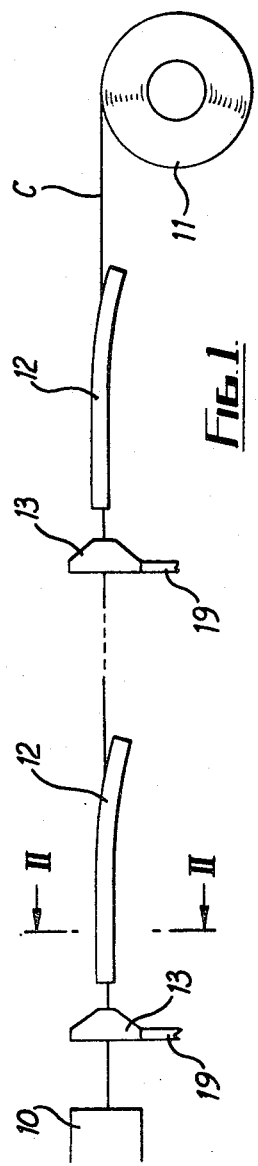
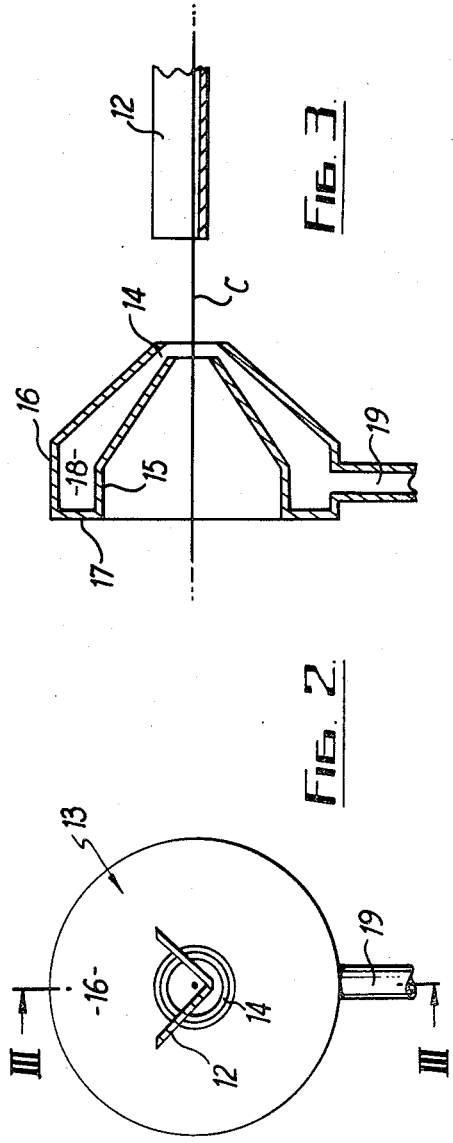
INVENTOR:
A. H. HILL
BY
James E. Nilles
ATTORNEY ized to be supplied with water
COOLING OF PLASTIC EXTRUSIONS OF SMALL CROSS-SECTIONAL AREA This invention concerns the cooling of plastics extrusions of small cross-sectional area particularly, though not exclusively, a tubular insulation sheath which has been extruded around a fine electrical conductor, by which term we mean an electrical conductor which may (as is commonly known) vary in diameter between about 0.013 and 0.040 inches. It is commonly accepted that the radial thickness of an insulating sheath for such an electrical conductor may lie between about 0.002 to 0.010 inches.

As is well known when a plastics extrusion emerges from an extrusion machine it is at an elevated temperature and readily susceptible to deformation, with the result that it is necessary to cool the extrusion rapidly and this is normally achieved by immersion thereof in water by pulling the extension through a water bath.

When dealing with plastics extrusions of small cross-sectional area such as the extrusions used for the insulation of fine electrical conductors severe problems can arise when the tension necessary to draw the insulated conductor through the water bath approaches the breaking point of the insulated conductor and the need to avoid excessive strain or breakages limits the length of water bath usable and hence the speed of extrusion. This problem is intensified when high extrusions rates are contemplated or used. For example, it is found that the problem exists to a marked extent at present extrusion rates of 1,500 to 5,000 ft/minute and clearly would be more marked at higher speeds.

It is an object of the present invention to provide a method and apparatus for cooling a plastics extrusion of small cross-sectional area which overcomes at least to some extent the problem aforesaid.

According to the present invention a method of cooling a plastics extrusion of small cross-sectional area includes the steps of drawing the extrusion along a predetermined path and directing water onto the extrusion at least at one position along said path under such conditions as not to disturb the lateral stability of the extrusion and such that the water impinging on the extrusion has a substantial component of velocity in the direction in which the extrusion is being drawn.

The invention also includes apparatus for carrying out the method aforesaid.

The invention will be further apparent from the following description with reference to the figures of the accompanying drawing, which show, by way of example only, one form of apparatus suitable for practicing the method of the invention.

Of the drawings:

FIG. 1 shows a side elevation of the apparatus;

FIG. 2 shows a cross-section of the apparatus on the line II—II of FIG. 1; and

FIG. 3 shows a cross-section of the apparatus on the line III—III of FIG. 2.

Referring now to the drawings it will be seen that a plastic insulation sheath is extruded from the die 10 onto a fine electrical conductor C from an extrusion machine of the kind which is conventional for this purpose. The insulated conductor C is wound onto a reel 11 at a position remote from the die 10, and may be progressed through a plurality of open-ended V-shaped guide troughs 12 disposed linearly there-between.

Water is sprayed at high velocity onto the sheath of the conductor C before its passage through each of the successive troughs 12 by means of nozzles generally indicated at 13. Each nozzle 13 comprises orifice means such as an annular orifice 14 which surrounds the insulated conductor C and which is defined between the forward edges of inner and outer conical nozzle walls 15 and 16 respectively forming with a back wall 17 an annular chamber 18 adapted to be supplied with water under pressure from a supply pipe 19. Each nozzle comprises a central opening as shown in FIGS. 2 and 3 for accommodating passage of insulated conductor C.

It will be appreciated that the water directed onto the insulated conductor C from each of the nozzles 13 impinges equally at all positions around the periphery of the insulated conductor C (which is arranged by the troughs 12 to pass centrally through the orifices 14) and that there is no resultant radial force on the insulated conductor to disturb its lateral stability. If for any reason the wire tends to move from the center of the orifice 14 there will be a net radial force acting on the wire which will tend to re-centralize the wire in the orifice 14. The jets therefore not only serve the purpose of cooling the coating but also serve as self centering means for the wire.

The water is directed onto the conductor sheath so as to have a substantial component of velocity in the axial direction in which the insulated conductor C is being drawn. The water thus travels with the insulated conductor thereby reducing drag and enabling the insulated conductor to be wound onto the reel 11 with a minimum of tension therein. In practice, it was found desirable to direct the water onto the extrusion at a velocity of not less than 40 percent of the velocity of the extrusion.

Since the water will travel with the insulated conductor, particularly if the nozzles are constructed to ensure that only a thin layer of water is sprayed, it may not be possible to achieve the requisite degree of cooling. In such a case it is desirable to change the water from time to time along the length of the insulated conductor. For this reason a plurality of troughs 12 and nozzles 13 are provided, and the rear end of each trough 12 is sloped downwardly to induce the water to leave the insulated conductor at these positions prior to passage of the insulated conductor through the following nozzle 13. Alternatively if the nozzles are constructed to spray a relatively thick layer of water onto the insulated conductor, to achieve optimum cooling, a large percentage of this will fall from the conductor due to gravitational forces and thus in such an arrangement it may not be necessary to provide the troughs. If the rate of cooling is sufficiently high it may in fact not be necessary to provide more than one nozzle.

It will be appreciated that it is not intended to limit the invention to the above example only, many variations being possible.

For example, the nozzles need not comprise an annular orifice but may have discrete orifices providing three or more jets directed onto the insulated conductor at equi-angularly spaced positions.

I claim:

1. A method of cooling a plastic extrusion of small cross-sectional area over a thin conductor moving horizontally at a high extrusion rate of not less than about 1,500 feet per minute, said extrusion and conductor having a total combined diameter not exceeding about 0.060 inch, including the steps of drawing the extrusion along a predetermined path and directing water onto the extrusion at least at one position along said path under such conditions that the water impinges upon the periphery of the extrusion so as not to displace it from its natural axis of motion and hence not to disturb the lateral stability of the extrusion, the water impinging on the extrusion having a substantial component of velocity in the direction in which the extrusion is being drawn, said component of velocity being not less than 40 percent of the velocity at which the extrusion is itself moving.

2. A method as claim in claim 1 in which water is directed onto the extrusion at least at one position along said path from at least one water nozzle having an annular orifice from which water is directed onto the extrusion at all positions around the periphery as it passes from an orifice concentric with the said annular orifice.

3. A method as claimed in claim 1 in which water is directed onto the extrusion at a plurality of positions along said path from a plurality of spaced-apart water nozzles.

4. A method as claimed in claim 1 including the step of directing a series in excess of two of equiangularly spaced jets of water onto the extrusion at least at one position along said path from at least one water nozzle.

5. A method as claimed in claim 4 including the step of directing jets of water onto the extrusion at a plurality of positions along said path from a plurality of spaced-apart water nozzles.

6. A method as claimed in claim 1 including the step of cooling the extrusion along a guide trough positioned downstream of the position of water impingement.

* * * * *